United States Patent
McGhee

(12) 
(10) Patent No.: US 6,363,244 B1
(45) Date of Patent: Mar. 26, 2002

(54) CARRRYING ATTACHMENT FOR A MOBILE PHONE

(75) Inventor: Edward Vincent McGhee, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 09/363,423

(22) Filed: Jul. 29, 1999

(51) Int. Cl.[7] ................................................. H04B 1/38
(52) U.S. Cl. ........................ 455/90; 455/575; D14/192; 379/450
(58) Field of Search .......................... 455/90, 575, 550; D14/192, 251, 252, 256, 188, 248, 250, 191; 379/429, 428, 430, 447, 449, 450

(56) References Cited

U.S. PATENT DOCUMENTS

| | | | | |
|---|---|---|---|---|
| 3,563,430 A | * | 2/1971 | Forrest | 224/255 |
| 4,847,818 A | * | 7/1989 | Olsen | 368/10 |
| 5,067,585 A | * | 11/1991 | Bell | 182/7 |
| 5,513,259 A | * | 4/1996 | Petit | 379/429 |
| 5,540,367 A | * | 7/1996 | Kauker | 224/269 |
| D401,935 S | * | 12/1998 | Scalisi et al. | D14/191 |
| D418,132 S | * | 12/1999 | Zoiss et al. | D14/147 |
| 6,189,651 B1 | * | 2/2001 | Sadeck | 182/6 |
| 6,195,039 B1 | * | 2/2001 | Glass, Jr. | 342/357.09 |

* cited by examiner

*Primary Examiner*—Nay Maung
*Assistant Examiner*—Joy K. Contee
(74) *Attorney, Agent, or Firm*—Coats & Bennett, P.L.L.C.

(57) ABSTRACT

A carrying attachment for a mobile communication device includes a caribiner that attaches to a clothing article (such as a belt or belt loop), a swivel mount that attaches to the mobile communication device, and a flexible toggle having a first end connected to the caribiner and a second end connected to the swivel mount. The caribiner comprises a closed ring with a hinged element that allows the caribiner to be hooked onto the user's belt loop. The caribiner attaches to a first end of the flexible toggle. The swivel mount attaches to a back side of the mobile communication device. The swivel mound is connected to a second end of the flexible toggle in a manner that allows the flexible toggle to rotate about the swivel mount.

12 Claims, 3 Drawing Sheets

CARRRYING ATTACHMENT FOR A MOBILE PHONE

FIELD OF THE INVENTION

The present invention relates in generally to accessories for mobile, handheld telephones and, more particularly to devices for attaching a mobile telephone to a belt or belt loop.

BACKGROUND OF THE INVENTION

Handheld mobile telephones have become ubiquitous in modern society. One reason for the popularity of mobile telephones is that the user can carry the phone from place to place thereby freeing the user from tethers to fixed communication networks. It is common practice to carry a handheld telephone in a purse or briefcase. The use of a purse or briefcase to carry the phone has some drawbacks. If the user wants the phone to be accessible, the user must keep the purse or briefcase close at hand, or remove the phone from the purse or briefcase. Further, not everyone carries a purse or briefcase. People who do not use a purse or briefcase need an alternate means for carrying the telephone.

It is also known to attach a belt clip to a mobile telephone or pager to allow the user to allow the phone or pager to be clipped onto a belt, waistband, or other clothing article. However, there are distinct disadvantages to using a belt clip. First, the belt clip is susceptible to damage during normal use. In particular, it is fairly common for the phone or pager to be hung (on the arm of a chair, for example) and be bent or broken as a result. Further, when the phone is not being carried, the belt clip prevents the phone from lying flat on a desktop or other surface.

Accordingly, there is a need for further improvement in devices for carrying a mobile telephone.

SUMMARY OF THE INVENTION

The present invention is a carrying attachment for a mobile communication device, such as a handheld cellular telephone. The carrying attachment comprises a caribiner that attaches to a clothing article (such as a belt or belt loop), a swivel mount that attaches to the mobile communication device, and a flexible toggle having a first end connected to the caribiner and a second end connected to the swivel mount. The caribiner comprises a closed ring with a hinged element that allows the caribiner to be hooked onto the user's belt loop. The caribiner attaches to a first end of the flexible toggle. The swivel mount attaches to a back side of the mobile communication device. The swivel mount is connected to a second end of the flexible toggle in a manner that allows the flexible toggle to rotate about the swivel mount.

The carrying attachment allows the phone to be hooked onto the user's garment, such as a belt or belt loop, so that the mobile communication device is carried from place to place with the user. The caribiner allows the user to quickly detach the phone from the user's clothing when placing or answering a call, and then quickly reattach the phone after use. The flexible toggle makes the carrying attachment less susceptible to damage than conventional belt attachments, and also reduces the risk of damage to the mobile communication device.

DETAILED DESCRIPTION OF THE INVENTION

Figure 1:
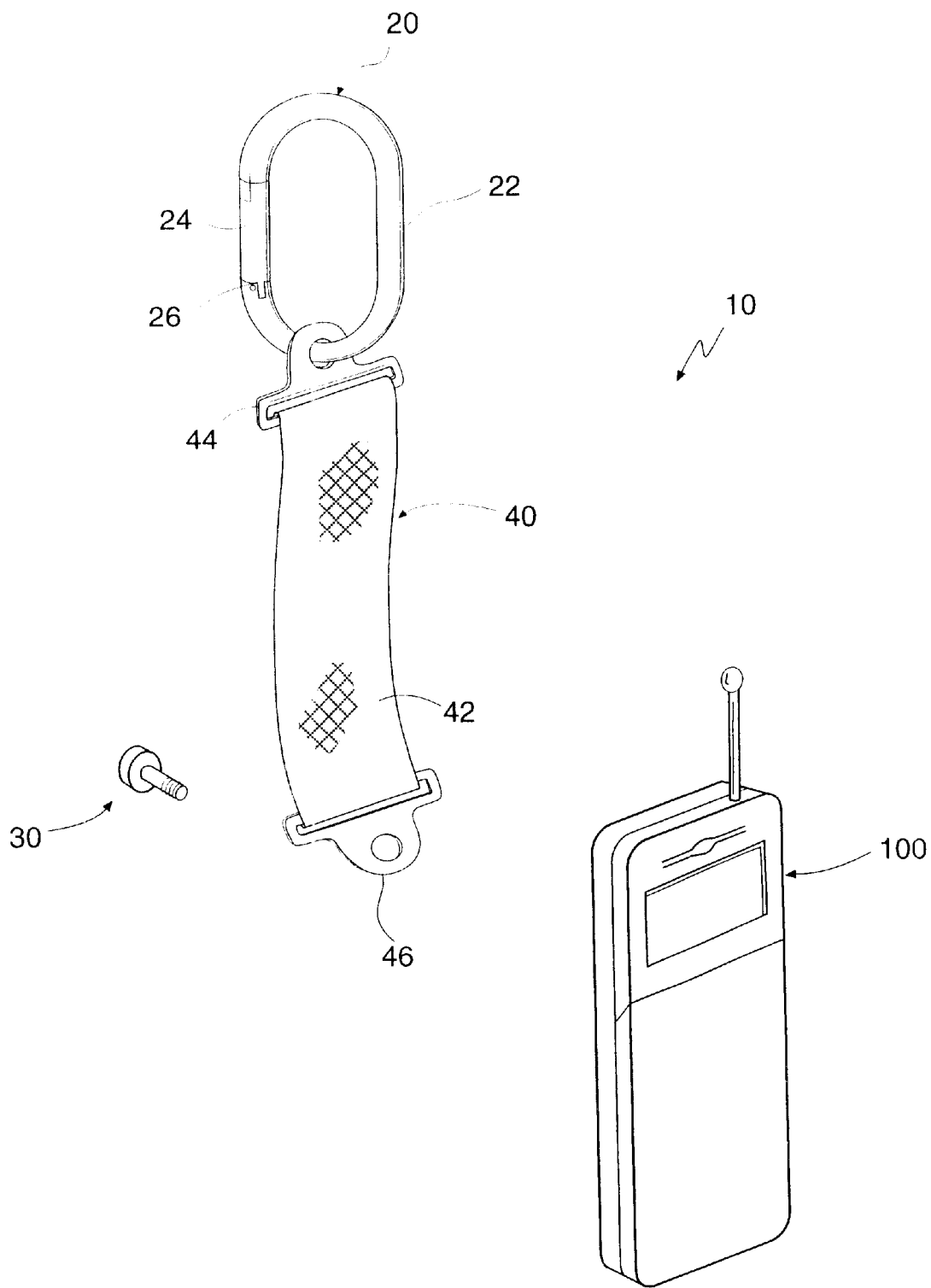
FIG. 1 is a perspective view showing the carrying attachment of the present invention.

Referring now to the drawings, and particularly to FIG. 1, the carrying attachment of the present invention is shown therein and indicated by the numeral 10. The carrying attachment 10 is used to support a mobile communication device 100, such as a cellular telephone, from an article of clothing worn by the user so that the mobile communication device 100 can be conveniently carried from place to place. The carrying attachment generally includes a caribiner 20, a swivel mount 30 for attaching to the back side of the mobile communication device 100, and a flexible toggle 40 connected at one end to the caribiner 20 and at the opposite end to the swivel mount 30.

The caribiner 20 comprises a C-shaped ring member 22 and a hinged member 24. Then hinged member 24 is pivotally attached to one end of the ring member 22 so as to rotate inwardly about pivot 26. The opposite end of the hinged member 24 overlaps with the free end of the ring member 22. A spring (not shown) biases the hinged member 24 to a closed position as shown in FIG. 1. The caribiner 20 can be easily engaged with an article of clothing by pressing the hinged member 24 inwardly and engaging the ring 22 with a loop, belt, or other clothing article worn by the user.

Figure 4:
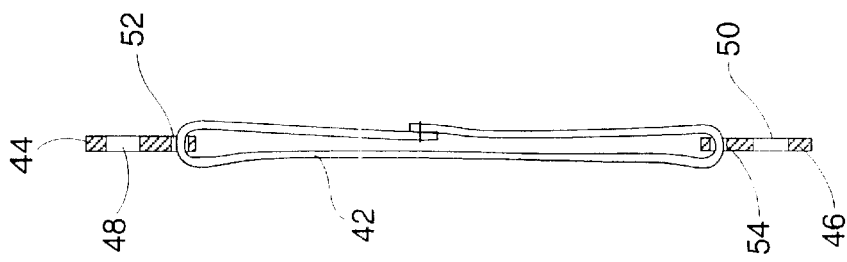
FIG. 4 is a side view showing a second embodiment of the flexible toggle.
Figure 3:
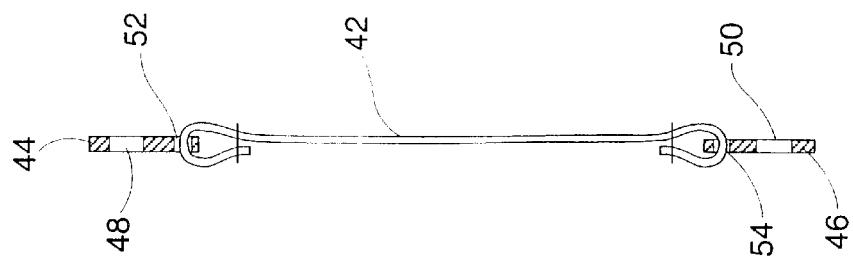
FIG. 3 is a side view showing a first embodiment of the flexible toggle.
Figure 2:
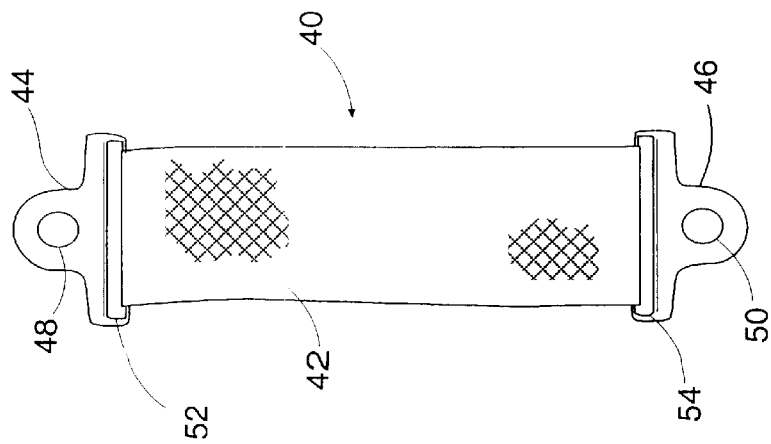
FIG. 2 is a front view of the flexible toggle.

The flexible toggle 40, shown in FIGS. 2–4, comprises flexible strap 42 and end connectors, 44 and 46. The strap 42 is preferably made of a durable fabric, such a nylon webbing. Any type of fabric materials can be used including any durable woven or non-woven fabric. Fabrics suitable for the present invention include fabrics made from both natural and synthetic materials, or a combination thereof. Also, the strap 42 could be made of leather or plastic materials. The strap 42 is approximately 3 to 4 inches (7.62–10.16 centimeters) in length. End connectors 44 and 46 are disposed at opposite ends of the strap 22.

The end connectors 44 and 46 are made preferably from a stamped metal or ABS plastic. Each end connector 44, 46 includes a central opening 48, 50, and a slot 52, 54. The function of the end connectors 54, 56 is to connect the flexible strap 42 to the caribiner 20 and swivel mount 30. Since the end connectors 44, 46 are identical, either end of the flexible strap 42 can be connected to the caribiner 20 or swivel mount 30. Slots 52, 54 are used to attach the end connectors 44, 46 to the strap 42. In a first embodiment, shown in FIG. 3, the ends of the strap 42 pass through the slots, 52, 54 in respective end connectors 44, 46. The ends of the strap 42 are then secured by stitching to an intermediate portion of the strap 42 to form a closed hem at each end of the strap 42. In the embodiment shown in FIG. 4, the opposing ends of the strap 42 pass through slots 52, 54 in respective end connectors 44, 46. The ends of the strap 42 are then stitched together so that the strap 42 forms a closed loop with end connectors 44, 46 disposed at opposing ends of the loop. If desired, the sides of the loop can then be stitched together at the center so, in essence, two separate loops are formed; one for each end connector 44, 46.

The swivel mount 30 is used to attach the flexible toggle 20 to the back side of the mobile communication device 100.

Figure 5:
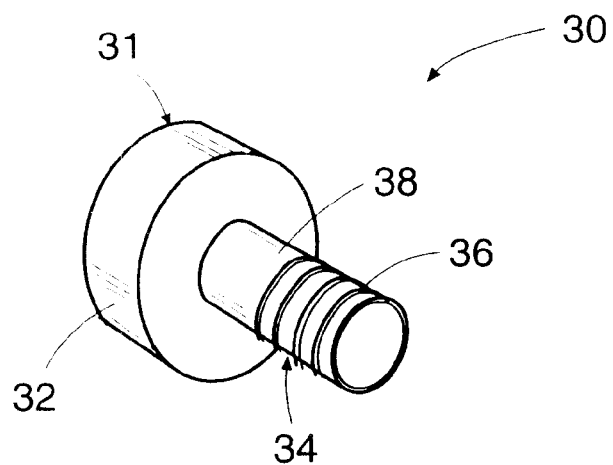
FIG. 5 is a perspective view showing the swivel mount.

FIG. 5 shows a swivel mount 30 that is suitable for use with mobile communication devices 100 having a screw mount (not shown) in the back side for a belt clip or other attachment. In this embodiment, the swivel mount 30 comprises a screw type fastener 31 having a head 32 and a shank 34. The shank 34 includes threaded and non-threaded portions, 36 and 38 respectively. The shank 34 is sized to pass through the opening 48, 50 in the end connector 44, 46. The swivel mount 30 threads into the screw mount in the back of the mobile communication device 100 so that a small gap is left between the head 32 of the screw mount 30 and the back of the mobile communication device 100. Thus, the end connector 44, 46 are free to rotate around the axis of the swivel mount 30 on the non-threaded portion 38.

Figure 6:
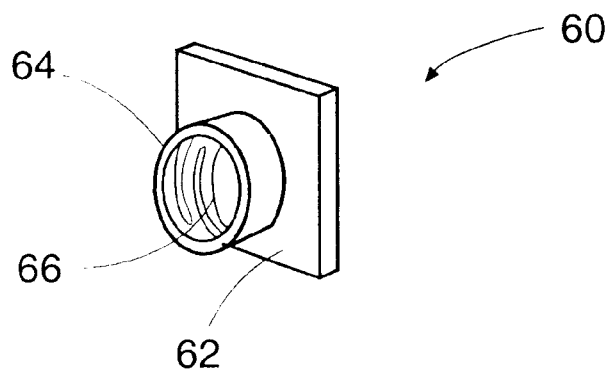
FIG. 6 is a perspective view showing an alternative embodiment of the swivel mount.

FIG. 6 shows a base member 60 that can be used with the swivel mount 30 when the mobile communication device is lacking a screw mount. The base member 60 includes a generally square base plate 62 with an internally threaded stub shaft 64 projecting from one side thereof. The base plate 62 can be secured to the back of a mobile communication 100 device using an adhesive. The stub shaft 64 extends out from the exposed surface of the base plate 62. The threaded opening 66 in the stub shaft 64 is sized to receive the swivel mount 30 shown in FIG. 5.

In use, one end of the flexible toggle 40 is attached the mobile communication device 100 using the swivel mount 30, and, if necessary, the base member 60. The caribiner 20 is then engaged with a clothing article worn by the user, such as a belt loop, belt, etc. The length of the toggle 40 allows the mobile communication device to be inserted into the user's pant pocket to prevent the mobile communication device 100 from jostling. The flexible toggle 40 allows the mobile communication device 100 to move with some freedom thereby reducing the risk of damage to the mobile communication device 100 or the carrying attachment 10. The caribiner 20 can be quickly detached from the clothing article when answering or placing a call and then quickly reattached when the call is finished.

What is claimed is:

1. A carrying attachment for a mobile communication device comprising:
   a. a carabiner for engaging an article of clothing worn by a user;
   b. a swivel mount for detachably securing the carrying attachment to the mobile communication device, said swivel mount including a threaded fastener to engage the mobile communication device;
   c. a flexible toggle connecting said carabiner to the swivel mount;
   said flexible toggle comprising:
      i) a flexible strap;
      ii) a first end connector attached to a first end of said flexible strap, said first end connector having a first slot formed therein to receive the flexible strap and a first opening to rotatably receive the swivel mount;
   d. wherein said first end connector is rotatable relative to said flexible strap about a first axis; and
   e. wherein said first end connector is rotatable relative to said swivel mount about a second axis perpendicular to said first axis.

2. The carrying attachment of claim 1 further comprising a second end connector attached to a second end of said flexible strap, said second end connector having a second slot formed therein to receive the flexible strap and a second opening to rotatably receive the carabiner.

3. The carrying attachment of claim 2 wherein said second end connector is rotatable relative to said flexible strap about a third axis parallel to said first axis.

4. The carrying attachment of claim 1 wherein said threaded fastener includes a threaded portion to thread into the mobile communication device and a non-threaded portion received in the first opening of the first end connector.

5. A mobile communication device comprising:
   a. a portable communication device including a housing;
   b. a carabiner for engaging an article of clothing worn by a user;
   c. a swivel mount for detachably securing the carrying attachment to the housing of the portable communication device, said swivel mount including a threaded fastener to engage the mobile communication device;
   d. a flexible toggle connecting said carabiner to the swivel mount;
   said flexible toggle comprising:
      i) a flexible strap;
      ii) a first end connector attached to a first end of said flexible strap, said first end connector having a first slot formed therein to receive the flexible strap and a first opening to rotatably receive the swivel mount;
   d. wherein said first end connector is rotatable relative to said flexible strap about a first axis; and
   e. wherein said first end connector is rotatable relative to said swivel mount about a second axis perpendicular to said first axis.

6. The mobile communication device of claim 5 further comprising a second end connector attached to a second end of said flexible strap, said second end connector having a second slot formed therein to receive the flexible strap and a second opening torotatably receive the carabiner.

7. The mobile communication device of claim 6 wherein said second end connector is rotatable relative to said flexible strap about a third axis parallel to said first axis.

8. The mobile communication device of claim 5 wherein said threaded fastener includes a threaded portion to thread into the mobile communication device and a non-threaded portion received in the first opening of the first end connector.

9. The carrying attachment according to claim 1 further including a swivel mount adapter for mounting on said mobile communication device to engage said swivel mount.

10. The carrying attachment according to claim 9 wherein said swivel mount adapter includes base and a stub member having a threaded opening engaged by said swivel mount.

11. The mobile communication device according to claim 5 further including a swivel mount adapter for mounting on said mobile communication device to engage said swivel mount.

12. The mobile communication device according to claim 11 wherein said swivel mount adapter includes base and a stub member having a threaded opening engaged by said swivel mount.

* * * * *